(12) United States Patent
Scudder

(10) Patent No.: US 11,077,701 B2
(45) Date of Patent: Aug. 3, 2021

(54) BANANA SHAPED WRITING DEVICE AND METHOD

(71) Applicant: Kia Scudder, San Antonio, TX (US)

(72) Inventor: Kia Scudder, San Antonio, TX (US)

(*) Notice: Subject to any disclaimer, the term of this patent is extended or adjusted under 35 U.S.C. 154(b) by 110 days.

(21) Appl. No.: 16/570,916

(22) Filed: Sep. 13, 2019

(65) Prior Publication Data
US 2020/0086677 A1    Mar. 19, 2020

Related U.S. Application Data

(60) Provisional application No. 62/730,802, filed on Sep. 13, 2018.

(51) Int. Cl.
*B43K 19/14* (2006.01)
*B43K 25/02* (2006.01)
*B43K 23/10* (2006.01)

(52) U.S. Cl.
CPC .............. *B43K 19/14* (2013.01); *B43K 23/10* (2013.01); *B43K 25/02* (2013.01)

(58) Field of Classification Search
CPC ........ B43K 19/02; B43K 19/14; B43K 23/00; B43K 23/004; B43K 23/008; B43K 23/08; B43K 23/10; B43K 23/12
See application file for complete search history.

(56) References Cited

U.S. PATENT DOCUMENTS

| | | | | |
|---|---|---|---|---|
| 1,647,536 A * | 11/1927 | Miller | .................... | B43K 23/00 401/88 |
| 4,595,307 A * | 6/1986 | Heyden | .................. | B43K 23/10 401/117 |
| 4,728,212 A | 3/1988 | Spector | | |
| 6,217,245 B1 * | 4/2001 | El-Fakir | ................. | B43K 5/005 401/195 |
| 6,328,493 B1 * | 12/2001 | Starchevich | ........... | B43K 7/005 40/334 |
| 6,773,183 B2 * | 8/2004 | Geddes | .................. | B43K 7/005 16/430 |
| 10,183,519 B1 * | 1/2019 | Landim Batista | ... | B43K 21/006 |

* cited by examiner

*Primary Examiner* — David P Angwin
*Assistant Examiner* — Bradley S Oliver
(74) *Attorney, Agent, or Firm* — Acumen Intellectual Property; Michael C. Balaguy

(57) ABSTRACT

A banana shaped writing device; the banana shaped writing device includes a body, a lead, a stem, a peel, and a metal clip. The banana shaped writing device is useful for allowing a user to peel the writing device and provides a cushioned finger hold. Further, the banana shaped writing device is helpful to teach children who are beginning to write the proper finger positions to write.

18 Claims, 5 Drawing Sheets

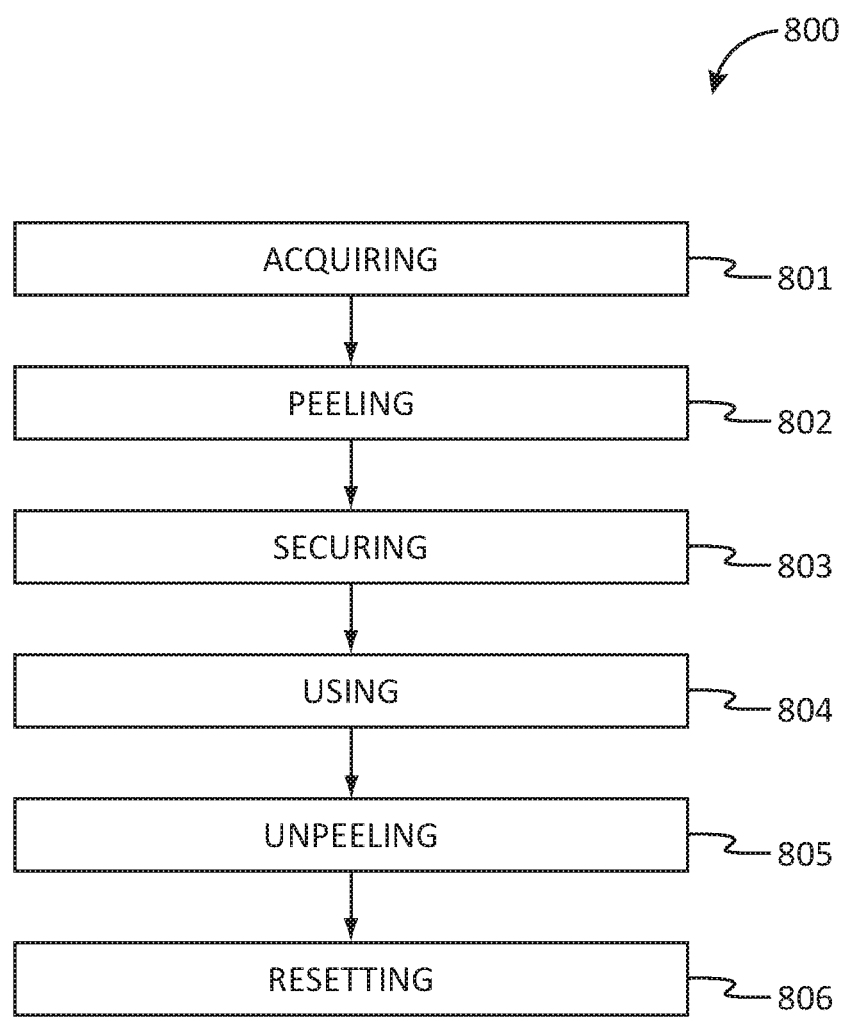

BANANA SHAPED WRITING DEVICE AND METHOD

CROSS-REFERENCE TO RELATED APPLICATION(S)

The present application is related to and claims priority to U.S. Provisional Patent Application No. 62/730,802 filed Sep. 13, 2018, which is incorporated by reference herein in its entirety.

BACKGROUND OF THE INVENTION

The following includes information that may be useful in understanding the present disclosure. It is not an admission that any of the information provided herein is prior art nor material to the presently described or claimed inventions, nor that any publication or document that is specifically or implicitly referenced is prior art.

TECHNICAL FIELD

The present invention relates generally to the field of writing devices of existing art and more specifically relates to writing devices with lead.

RELATED ART

Writing devices with lead, commonly called pencils, are used by a large portion of the population. In many cases a pencil may prove difficult to hold and often requires a separate device to sharpen the pencil. A pencil may be hard to hold because they are typically thin and made of a rigid material. This lends to them not being very ergonomic for prolonged use and may cause finger pain if the user holds the pencil in a very firm grip. They also require a device to sharpen them for extended use. These devices often have a sharp blade in them which makes sharpening a pencil potentially dangerous. Further, it is tedious to keep a sharpening device with the user while using a pencil.

A traditional pencil is also very plain looking and not very much fun to use. This can cause children to not want to use the pencil. This can make it difficult to teach the child to write. The thin size can also add to the difficulty for a child to hold and therefore, an additional grip may be necessary. This makes yet another item needed to adequately use the pencil. These same issues with a pencil can be seen in pens as well. A suitable solution is desired.

U.S. Pat. No. 4,728,212 to Donald Spector relates to a novelty writing pen. The described novelty writing pen is constituted by a standard pen having an ink reservoir encased in a sheath and terminating in a writing tip projecting from one end of the sheath, and a molded body configured to represent a familiar object such as a fruit emitting a characteristic odor, the body having a bore therein to receive at least the upper section of the sheath so that the body is carried by the pen. The ink in the pen incorporates an odor-producing component which is compatible therewith. When the pen is put to use, this component causes the surface written on by the pen to exude an odor simulating that of the object carried thereby.

SUMMARY OF THE INVENTION

In view of the foregoing disadvantages inherent in the known writing device with lead art, the present disclosure provides a novel banana shaped writing device. The general purpose of the present disclosure, which will be described subsequently in greater detail, is to provide an efficient and effective writing device.

A banana shaped writing device is disclosed herein. The banana shaped writing device includes a body having a diameter and a length, a lead, a stem, a peel, and a metal clip; wherein the body is defined by the diameter and the length and is connected to the stem and surrounds the lead. The peel surrounds the body to protect the lead such that as the peel is removed rearwardly and the lead is exposed for writing use. The peel is soft and provides comfort and allows for definite finger-positioning in preferred embodiments.

According to another embodiment, a method of using a banana shaped writing device is also disclosed herein. The method of using a banana shaped writing device includes: providing a banana shaped writing device as disclosed herein; peeling the peel back to expose the lead; securing the peel back; using the device for writing; configuring the device for storage, rolling the peel back such that micro magnetic gel beads engage each other, and disengaging the micro magnetic gel beads by unpeeling the peel and closing the peel back around the lead.

For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and methods of use for the present disclosure, a banana shaped writing device, constructed and operative according to the teachings of the present disclosure.

FIG. 5 is a flow diagram illustrating a method of use for the banana shaped writing device, according to an embodiment of the present disclosure.

The various embodiments of the present invention will hereinafter be described in conjunction with the appended drawings, wherein like designations denote like elements.

DETAILED DESCRIPTION

As discussed above, embodiments of the present disclosure relate to a writing device with lead and more particularly to a banana shaped writing device as used to improve the efficient and entertaining use of writing devices.

Generally, the banana shaped writing device is a pencil that resembles a banana wherein the banana is peeled to reveal the lead. The banana shaped writing device allows the users to access additional lead when it gets too short or dull by peeling the banana layers. It enables children and even adults to stand out by using such a unique pencil. The device includes a cushioned inside that provides comfort to users, especially left-handed users. The present invention assists children that are beginning to learn how to write remember correct finger position.

Referring now more specifically to the drawings by numerals of reference, there is shown in FIGS. 1-4, various views of a banana shaped writing device 100.

Figure 1:
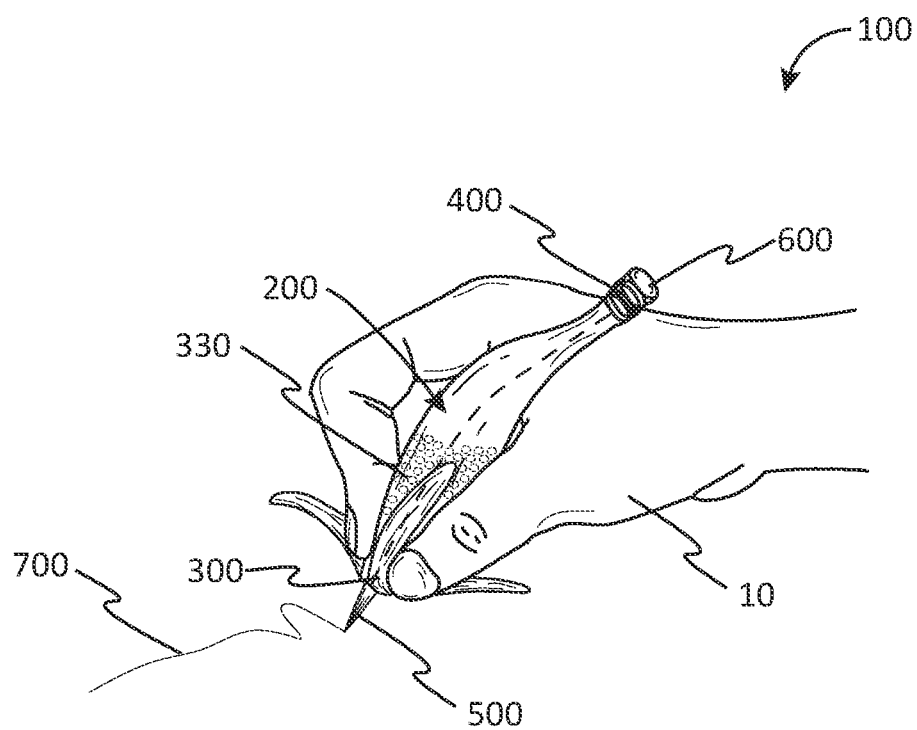
FIG. 1 is a perspective view of the banana shaped writing device during an 'in-use' condition, according to an embodiment of the disclosure.

FIG. 1 shows a banana shaped writing device 100 system and method during an 'in-use' condition 50, according to an embodiment of the present disclosure. Here, the banana shaped writing device 100 may be beneficial for use by a user 40 to write in a comfortable manner. As illustrated, the banana shaped writing device 100 may include a body 200, a lead 500, a stem 600, a peel 300, and a metal clip 400. The body 200 may have a diameter and a length. The diameter may be between 6 mm and 10 mm and the length may be 3.5 inches and 7.5 inches. Further, the body 200 may include all aspects of the banana shaped writing device 100. The peel 300 may surround a foam 320 that may be made from silicone or other suitable material. The foam 320 may have a plurality of micro magnetic gel beads 330 embedded throughout. The foam 320 may surround an adhesive sheath 310 that further surrounds the lead 500. There may also be slits 210 that extend from the exterior of the peel 300 through the foam 320 and the adhesive sheath 310. On one end of the body 200 the slits 210 may open to expose the lead 500. On the opposite end of the body 200 the stem 600 may be attached. The stem 600 may be made of a synthetic rubber and may be used as an eraser. The metal clip 400 may be a torsion spring that is inside the base of the stem 600 and may have attachments (not shown) that extend through the foam 320. The metal clip 400 may prevent the slits 210 from opening inadvertently in a default storage state.

According to one embodiment, the banana shaped writing device 100 may be arranged as a kit 105. In particular, the banana shaped writing device 100 may further include a set of instructions 107. The instructions 107 may detail functional relationships in relation to the structure of the banana shaped writing device 100 such that the banana shaped writing device 100 can be used, maintained, or the like, in a preferred manner.

Figure 2:
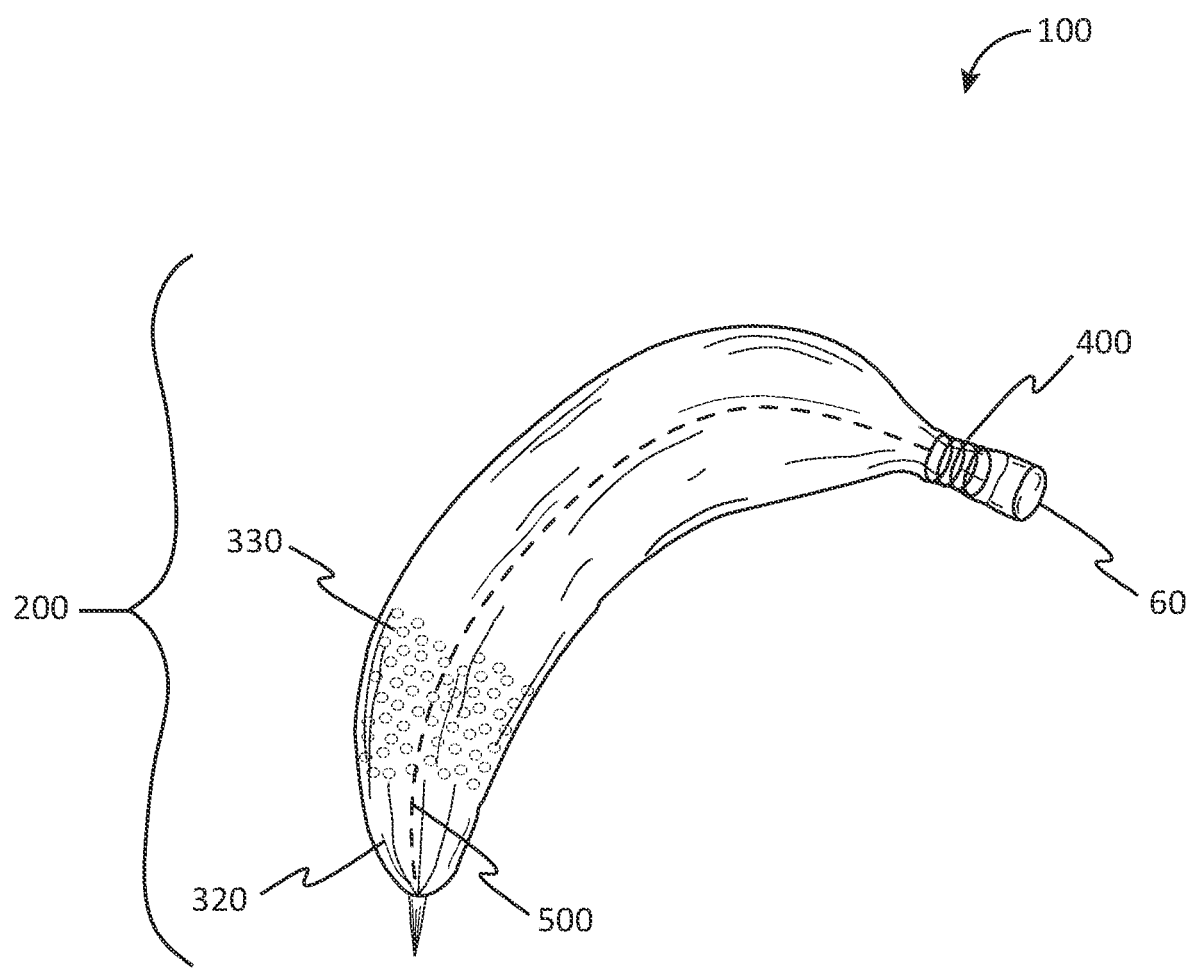
FIG. 2 is a closed view of the banana shaped writing device of FIG. 1, according to an embodiment of the present disclosure.

FIG. 2 shows the banana shaped writing device 100 of FIG. 1 in a closed state, according to an embodiment of the present disclosure. As above, the banana shaped writing device 100 may include a body 200 having a diameter and a length, a peel 300, and a stem 600. The diameter may be between 6 mm and 10 mm and the length may be between 3.5 inches and 7.5 inches. Other dimensions may be used. Further, the body 200 may have a curve that resembles a traditional banana shape to promote functional ease of use at a preferred angle manipulatable relative to a writing surface 700. The peel 300 may surround the body 200 up to the stem 600. The peel 300 may be made of a silicone material to provide grip and comfort. The stem 600 may be made of a synthetic rubber. This synthetic rubber may be helpful for to erase any marks made by the lead 500. A plurality of micro magnetic gel beads 330 are shown with small dashed circles. These micro magnetic gel beads 330 are suspending in a foam 320 that is not shown in FIG. 2. The metal clip 400 may comprise other materials suitable for use. Further, clips may be used to hold the peel(s) 300 in place during use and non-use periods. Those with ordinary skill in the art will now appreciate that upon reading this specification and by their understanding the art of clips and fasteners for holding the peel in preferred positioning in relation to the lead for use and non-use periods and dispensing of lead as used as described herein, methods of opening and closing and holding and dispensing will be understood by those knowledgeable in such art.

Figure 3:
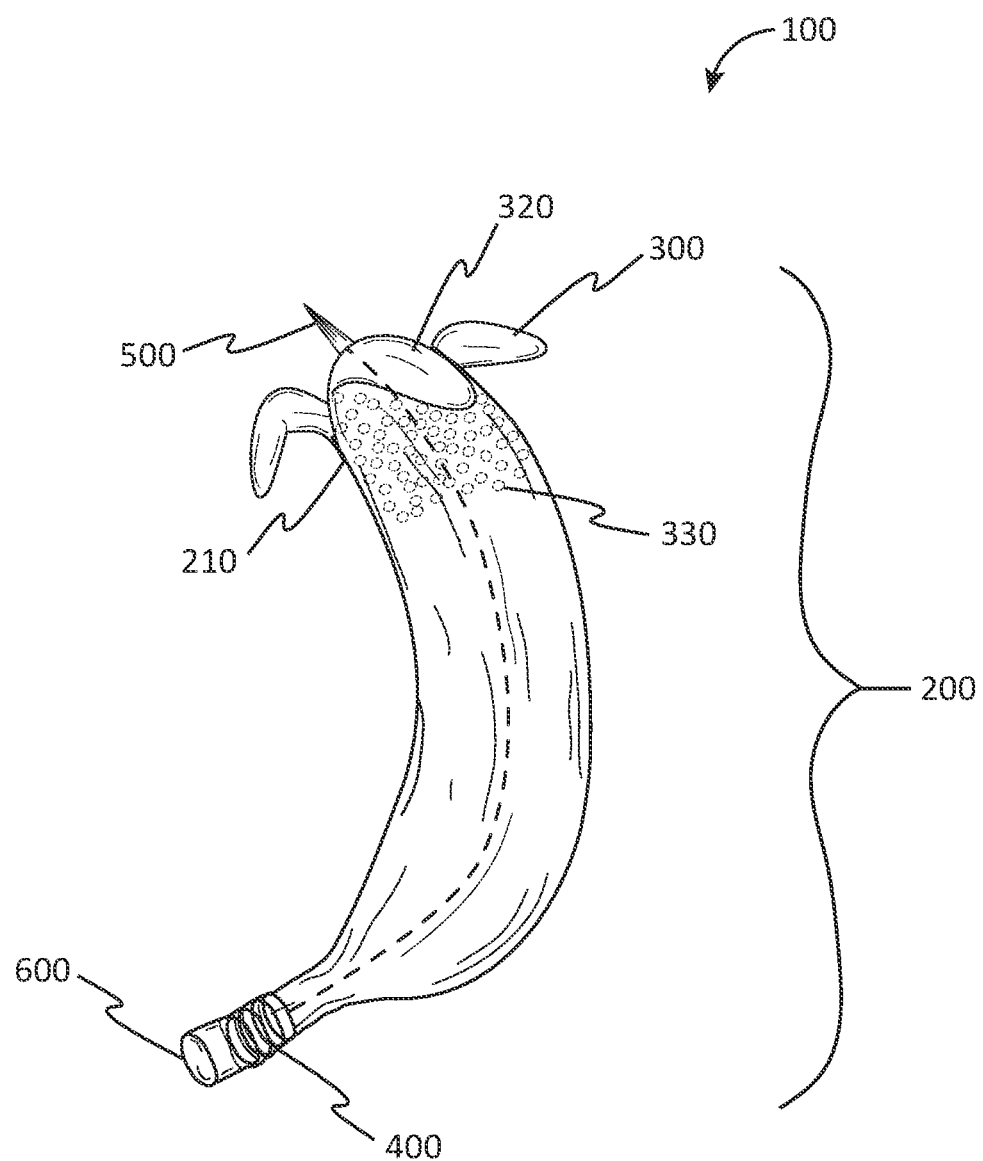
FIG. 3 is an open view of the banana shaped writing device of FIG. 1, according to an embodiment of the present disclosure.

FIG. 3 is an open view of the banana shaped writing device 100 of FIG. 1, according to an embodiment of the present disclosure. As above, the banana shaped writing device 100 may include a body 200 having a diameter and a length, a peel 300, and a stem 600. The diameter may be between 6 mm and 10 mm and the length may be between 3.5 inches and 7.5 inches. Further, the body 200 may have a curve that resembles a traditional banana shape to promote functional ease of use at a preferred angle manipulatable relative to a writing surface 700, as previously mentioned. At the writing end there may be a plurality of slits 210 that extent through the peel 300, a foam 320, and an adhesive sheath 310. There may be 2 to 3 slits 210. The adhesive sheath 310 may be between the lead 500 and the foam 320. Further, the adhesive sheath 310 may made of an adhesive that is removably coupleable to the lead 500. The lead 500 may be made of a soft graphite polymer and with a thickness of 0.5 mm to 0.7 mm. This soft graphite may be able to make marks on a surface while being consumed in the process. The part of the body 200 that is rolled back when exposing the lead 500 may be secured by the self-interaction between the micro magnetic gel beads 330. When the exposed lead 500 is consumed by writing the body 200 may be rolled further up to expose more lead 500.

Figure 4:
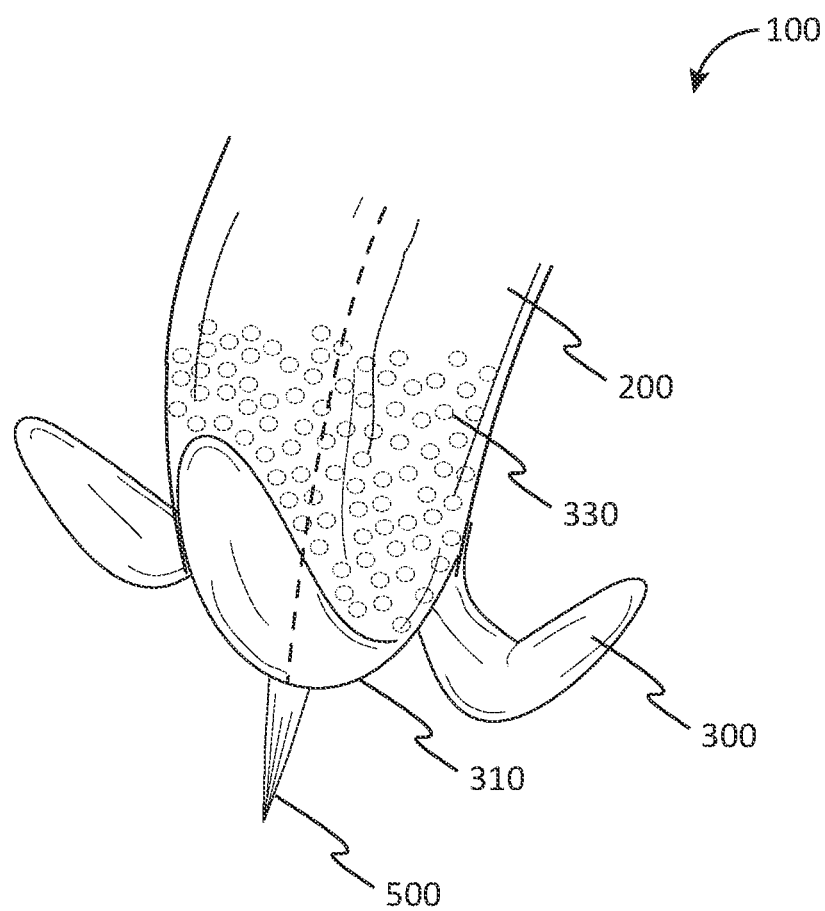
FIG. 4 is a close-up view of the banana shaped writing device of FIG. 1, according to an embodiment of the present disclosure.

FIG. 4 is a close-up view of the banana shaped writing device 100 of FIG. 1, according to an embodiment of the present disclosure. As above, the banana shaped writing device 100 may include a body 200, a peel 300, and a lead 500.

At the writing end there may be a plurality of slits 210 that extent through the peel 300, a foam 320, a plurality of micro magnetic gel beads 330, and an adhesive sheath 310. There may be 2 to 3 slits 210. The adhesive sheath 310 may be between the lead 500 and the foam 320. Further, the adhesive sheath 310 may made of an adhesive that is removably coupleable to the lead 500. The lead 500 may be made of a soft graphite polymer and with a thickness of 0.5 mm to 0.7 mm. This soft graphite may be able to make marks on a surface while being consumed in the process. The part of the body 200 that is rolled back when exposing the lead 500 may be secured by the self-interaction between the micro magnetic gel beads 330. When the exposed lead 500 is consumed by writing the body 200 may be rolled further up to expose more lead 500.

FIG. 5 is a flow diagram illustrating a method for use 800 of the banana shaped writing device 100, according to an embodiment of the present disclosure. In particular, the method for use 800 may include one or more components or features of the banana shaped writing device 100 as described above. As illustrated, the method for use 800 of banana shaped writing device 100 may include the steps of: step one 801, providing and having the device in a default storage state, step two 802, rolling the peel back; step three 803, securing the peel such that micro magnetic gel beads engage each other; step four 804, using the banana shaped writing device; step five 805, disengaging the micro magnetic gel beads by unpeeling the peel and closing the peel back around the lead; step six 806, resetting the device to the default state.

The use of "step of" should not be interpreted as "step for", in the claims herein and is not intended to invoke the provisions of 35 U.S.C. § 112(f). It should also be noted that, under appropriate circumstances, considering such issues as design preference, user preferences, marketing preferences, cost, structural requirements, available materials, technological advances, etc., other methods for the banana shaped writing device 100, are taught herein.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A banana shaped writing device comprising:
   a. a foam-body having
      a diameter; and
      a length;
   b. a lead;
   c. a stem;
   d. a peel; and
   e. a metal clip,
      wherein the foam-body is defined by the diameter and the length and is connected to the stem and surrounds the lead, further, the peel surrounds the body to protect the lead and such that as the peel is removed rearwardly the lead is exposed for writing use;
      further comprising an adhesive sheath which allows the peel to be removed from the lead in a controlled manner; and
      wherein the peel is soft and allows for definite finger-positioning.

2. The device of claim 1 wherein the diameter is between 6 mm and 10 mm.

3. The device of claim 2 wherein the length is between 3.5 inches and 7.5 inches long and the lead is a soft graphite polymer and has a thickness of 0.5 mm to 0.7 mm.

4. The device of claim 1 wherein the length is between 3.5 inches and 7.5 inches long.

5. The device of claim 1 wherein the lead is a soft graphite polymer and has a thickness of between 0.5 mm to 0.7 mm.

6. The device of claim 1 wherein the stem comprises a synthetic rubber.

7. The device of claim 1 wherein the peel is constructed of silicone.

8. The device of claim 1 wherein the foam-body is constructed of a silicone foam.

9. The device of claim 8 wherein a plurality of micro magnetic gel beads are embedded in the silicone foam.

10. The device of claim 9 wherein the peel is constructed of said silicone and has 2 to 3 slits that extends from the peel through the foam-body to the lead.

11. The device of claim 10 wherein the metal clip is a torsion spring that prevents the peel and foam-body from opening when not desired.

12. The device of claim 1 wherein the metal clip is in tension.

13. The device of claim 1 wherein the adhesive sheath comprises adhesive that is removably coupleable.

14. The device of claim 13 wherein the foam-body is curved to promote functional ease of use at a preferred angle manipulatable relative to a writing surface.

15. A banana shaped writing device comprising:
    a. a foam-body constructed of a silicone foam having
       a diameter between 6 mm and 10 mm; and
       a length between 3.5 inches and 7.5 inches;
    b. a lead that is a soft graphite polymer with a thickness between 0.5 mm and 0.7 mm;
    c. a stem comprising a synthetic rubber;
    d. a peel constructed of silicone; and
    e. a metal clip comprising a torsion spring
       wherein the foam-body is defined by the diameter and the length and is connected to the stem and surrounds the lead, further, the peel surrounds the body to protect the lead and such that as the peel is removed rearwardly the lead is exposed for writing use;
       wherein the peel is soft and allows for definite finger-positioning;
       wherein a plurality of micro magnetic gel beads are embedded in the silicone foam;
       wherein the peel has 2 to 3 slits that extends from the peel through the foam-body to the lead;
       wherein an adhesive sheath comprises an adhesive that is removably coupleable and allows for the peel to be removed from the lead in a controlled manner; and
       wherein the torsion spring is under tension and prevents the peel and foam-body from opening when not desired.

16. A method of using the banana shaped writing device of claim 15, comprising the steps of:
    securing the peel back;
    using the banana shaped writing device; and
    configuring the banana shaped writing device for storage.

17. The method of claim 16 further comprising the step of:
    rolling the peel back such that micro magnetic gel beads engage each other.

18. The method of claim 17 further comprising the steps of:
    disengaging the micro magnetic gel beads by unpeeling the peel and closing the peel back around the lead.

* * * * *